United States Patent
Wilkinson

[15] 3,658,422
[45] Apr. 25, 1972

[54] DUAL RANGE DOUBLE BEAM NULL-TYPE SPECTROPHOTOMETER

[72] Inventor: Michael Burton Wilkinson, Cambridge, England

[73] Assignee: Pye Limited, Cambridge, England

[22] Filed: May 12, 1970

[21] Appl. No.: 36,547

[30] Foreign Application Priority Data

July 18, 1969 Great Britain ..................36,376/69

[52] U.S. Cl. ..................356/89, 250/226, 356/93
[51] Int. Cl. ..................G01j 3/42
[58] Field of Search ..................356/74, 88, 98; 250/226

[56] References Cited

UNITED STATES PATENTS

| 3,062,088 | 11/1962 | Bolz | 356/89 |
| 3,463,594 | 8/1969 | Myer | 356/172 |
| 3,512,889 | 5/1970 | Liston | 356/94 |

FOREIGN PATENTS OR APPLICATIONS

| 962,735 | 7/1964 | Great Britain | 356/89 |

Primary Examiner—Ronald L. Wibert
Assistant Examiner—V. P. McGraw
Attorney—Watson, Cole, Grindle & Watson

[57] ABSTRACT

A spectrophotometer of the double-beam null type having a reference beam passing through a reference cell and a sample beam passing through a sample cell and means for adjusting the relative attenuation of the two beams which is operable over two ranges of measurement. Two attenuators are provided, one in each beam, the two attenuators giving different ranges of attenuation. The two attenuators can be operated together, one increasing attenuation as the other decreases it, so that a maximum range of relative attenuation is obtained or one attenuator is operated alone. The attenuators are mechanically movable attenuating elements which can be electrically locked together and control means are provided which automatically bring the two together and lock them when both are to be used or automatically move one to a datum position and locks it there when only the other is to be used.

16 Claims, 4 Drawing Figures

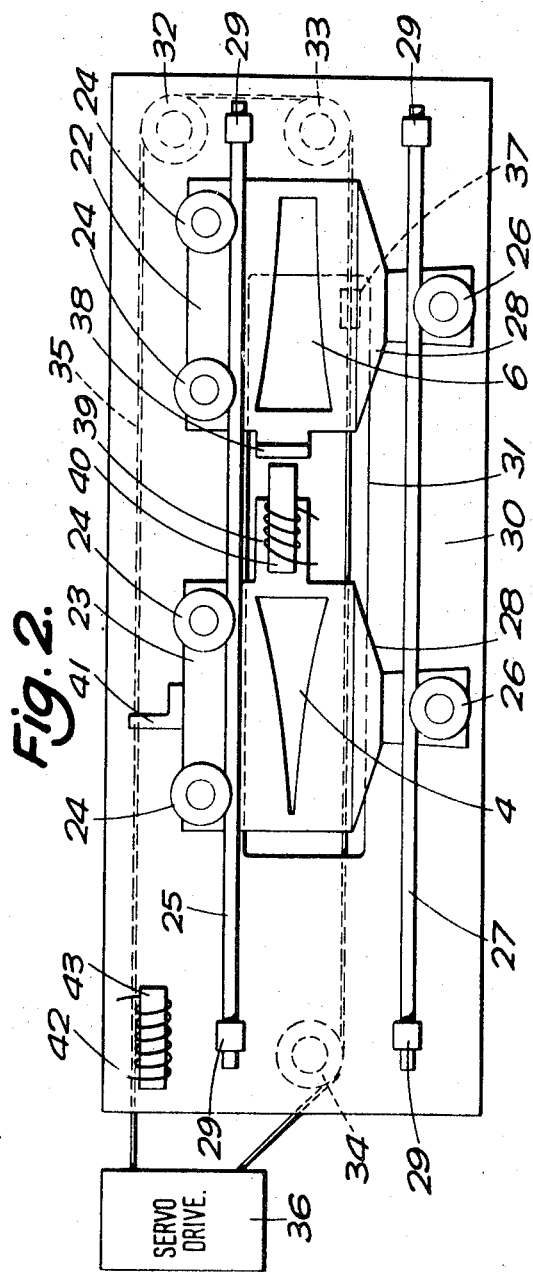

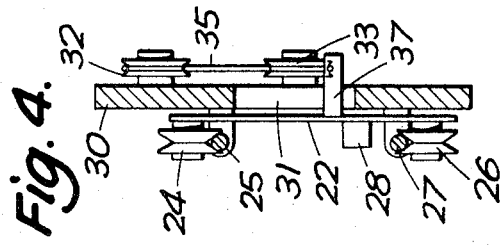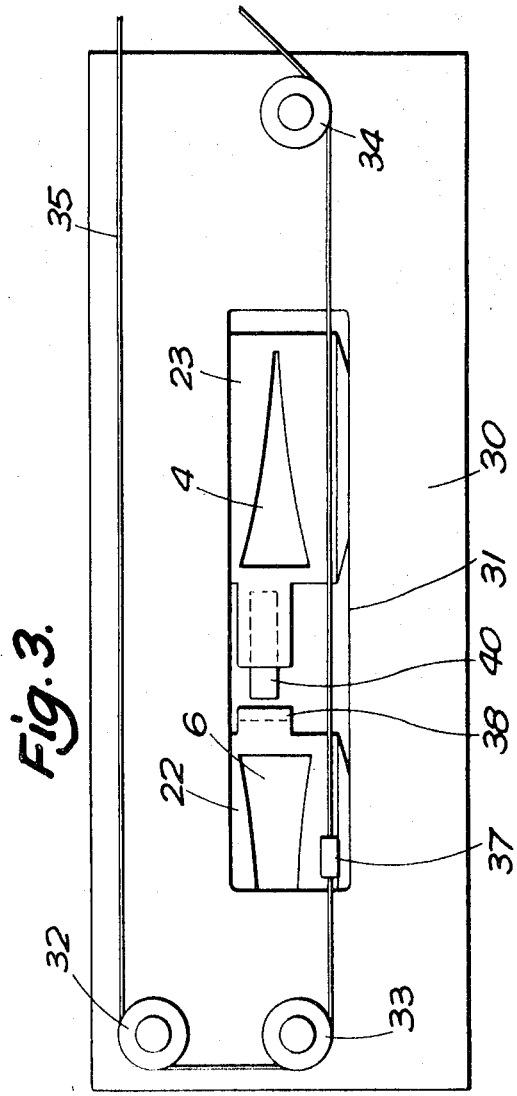

DUAL RANGE DOUBLE BEAM NULL-TYPE SPECTROPHOTOMETER

BACKGROUND OF THE INVENTION

1. Field of the Invention

The present invention relates to spectrophotometers, and more particularly relates to a double-beam null-type spectrophotometer suitable for use in the ultra-violet, visible and infra-red regions of the spectrum.

2. Description of the Prior Art

In double beam spectrophotometers, a beam of radiation from a source, or from an exit slit of a monochromator is arranged to traverse alternately two similar optical paths, the first passing through a suitable cell containing a reference material, the second passing through a similar cell containing a sample material. The radiation from the two paths is directed on to a common radiation detector whose output voltage is amplified. If the amount of radiation absorbed in the sample cell differs from that absorbed in the reference cell, the output voltage of the detector amplifier will contain an alternating component. In a null-type spectrophotometer, this alternating component is employed to drive a servomotor which in turn controls the position of an optical attenuator placed in one of the beams so as to equalize the amounts of radiation received by the detector via the sample cell and via the reference cell. The alternating component in the detector output will then fall to zero and the servomotor will stop. The attenuator is coupled to an indicator, such as a meter or a pen recorder which is calibrated to show the position of the attenuator in the light beam.

If, for example, the sample cell contains a sample of a substance of interest dissolved in a suitable solvent, and the reference cell contains pure solvent, the initial difference in the intensities of the sample and reference beams reaching the detector, with the optical attenuator set to produce zero attenuation, will depend solely on the absorption of incident radiation by the sample material. If the attenuator is then introduced into the reference beam and moved to a position in which the two intensities are equal, the position of the attenuator as shown by the indicator will be a measure of the absorption produced by the sample material.

The attenuator may consist of one or more apertures etched or cut in metal foil, the apertures having the form of slits which change in width along their length, the attenuator being movable transverse to the beam of light so that the latter falls on portions of the slits of different widths for different settings of the attenuator. The relationship between slit width and slit length will depend on the function of the sample transmission which it is desired to record. Normally it is required to record either the transmittance T or the absorbance A of the sample. Transmittance is defined as the ratio of the intensity of the transmitted light to that of the incident light ($T = I/I_o$), while the absorbance A is related to the transmittance T by the expression $A = -\log_{10} T$. If the attenuator has a linear relationship between slit width and slit length, the attenuator position for an optical null between the sample and reference beams will be a linear function of the sample transmittance, whereas an attenuator having a relationship of the form $y = a$ antilog $bx$, where $a$ and $b$ are constants, between slit width $y$ and length $x$, will give a linear relationship between attenuator position and absorbance.

A pen recorder having its pen coupled in a linear manner to the attenuator and its chart drive coupled to the monochromator may be employed automatically to record the chosen function (transmittance or absorbance) of the sample as a function of wavelength.

In more sophisticated instruments it is known to provide two attenuators, disposed one in the sample beam, the other in the reference beam, coupled together and arranged so that as the attenuation in the reference beam is increased, that in the sample beam is decreased, and vice versa. An arrangement of this type is described in British Pat. No. 962,735.

Typically, a spectrophotometer capable of measuring absorbance ($A$) over a range from $A = 0$ to $A = 1$ is found suitable for general chemical use. However, the details of weak absorption bands in an absorption spectrum plotted on such a spectrophotometer may be different to distinguish. Also in certain types of work, for example biochemical analyses, it may be required to measure relatively small changes in absorbance. For these purposes it is desirable that the spectrophotometer should be provided with two ranges, for example a coarse range in which an absorbance $A = 1$ produces full scale deflection, and a fine range for which $A = 0.2$ produces full scale deflection of the recorder pen.

It has been proposed to provide, in a spectrophotometer in which the full travel of the attenuator corresponds to a change in absorbance from 0.2. $A = 0$ to $A = 1$, a two-ratio gearbox in the linkage between the attenuator and the recorder pen. A first ratio of the said gearbox provides full scale deflection of the pen for full travel of the attenuator, and a second ratio produces full scale pen deflection when the attenuator is moved through a fraction, e.g., one-fifth, of its total travel. Thus, with the first ratio in use, the recorder covers the range of absorbance from $A = 0$ to $A = 1$, and with the second ratio in use, the range $A = 0$ to $A = 2$.

In such an arrangement, since for the fine range the attenuator moves over only a portion of its possible travel to produce full scale deflection, the effects of any departures from the intended law relating attenuator position and absorbance are greater when operating in the fine as opposed to the coarse range. Errors due to mechanical imperfections of the gearbox are also greater when operating in the fine range mode. For these reasons absorption spectra recorded with the spectrophotometer set to the fine range are less accurate than those recorded in the coarse range.

SUMMARY OF THE INVENTION

A spectrophotometer incorporating the present invention provides two-range operation and produces absorption spectra of comparable accuracy on the two ranges.

According to the present invention, in a two range spectrophotometer of the double-beam null type having a reference beam passing through a reference cell and a sample beam passing through a sample cell and detector means responsive to the difference in amplitudes of the two beams, there are provided first and second adjustable attenuators, one of the attenuators being arranged in the sample beam and the other in the reference beam, the first attenuator giving a range of attenuation M and the second attenuator having a different range of attenuation N where N is greater than M, servo means for adjusting the first attenuator in accordance with the difference in amplitudes of the beams at said detector means and range selector means for selectively either locking the second attenuator or coupling it to be driven with the first, the two attenuators, when driven together, being arranged so that, as the attenuation in one beam is increased, that in the other beam is decreased. Preferably the second attenuator, when locked, is locked in a position where it introduces minimum attenuation in the beam in which it is situated. It will be seen that, if the second attenuator is locked in the minimum position, the system provides for adjustment of the attenuation in one beam only to give a range of measurement of absorbance M. When the two attenuators are coupled together however, the total change of absorbance which can be measured is M plus N. In each case the absorbance is indicated by the extent of adjustment of the first attenuator. These attenuators are conveniently adjustable by mechanical displacement; the first attenuator may be mechanically or otherwise linked to a recorder pen for recording on either range according to the setting of the range selector means. There is no change in any link ratio required when changing range.

The two attenuators conveniently each comprise an opaque element, e.g., metal foil, with one or more slits suitably shaped so that, as the element is traversed across the radiation beam, the latter falls on different portions of the slit or slits of different widths according to the attenuator setting.

Conveniently the two attenuators are mounted on carriages with electromagnetic coupling means for coupling the two carriages to move together when required. By this arrangement electrical control means may readily be provided for coupling or uncoupling the electromagnetic coupling means for the two attenuators. Similarly electromagnetic locking means may be provided locking the second attenuator in the datum position which, as previously mentioned, is normally the position of minimum attenuation. The selector means may comprise a control switch having two positions with detents for locking the switch, which positions correspond to the two possible ranges, said switch having contacts at these two positions appropriately controlling the aforementioned electromagnetic couplings. On switching from fine range to coarse range, it is necessary to bring the two attenuators together so that they may be coupled. On switching from coarse range to fine range, the coarse attenuator that is to say the second attenuator has to be locked in the datum position. Preferably automatic means are provided for adjusting the positions of the attenuators on switching from coarse range to fine range or vice-versa.

Conveniently, the aforementioned switch has an intermediate position without detents, in which intermediate position a circuit is completed, as the switch is moved from one range setting to the other, for feeding a signal into the servo drive for the attenuator to set the second attenuator into its datum position and to set the first attenuator in the appropriate position so that it can be coupled to the second attenuator. If the datum position is minimum attenuation for the second attenuator, the first attenuator is set to maximum attenuation. By this means, as the operator changes the control from one range to the other automatically the appropriate adjustment of the attenuation is effected. Since the switch may only momentarily pass through the intermediate position, a relay, with holding or delay means for holding the relay, may be provided for maintaining the aforementioned circuit closed for a period sufficiently long for the adjustment of the attenuators to be effected. The circuit may comprise means for feeding a signal to the attenuator drive which overrides the output of the detector means comparing the amplitude of the two beams and sets the second attenuator to its minimum position. Preferably means are also provided for automatically feeding a similar signal into the servo drive when first switching on.

BRIEF DESCRIPTION OF THE DRAWINGS

FIG. 2 is a front view;
FIG. 3 is a rear view;
and
FIG. 4 is a cross-sectional view of an attenuator assembly according to the invention.

DESCRIPTION OF THE PREFERRED EMBODIMENT

Figure 1:
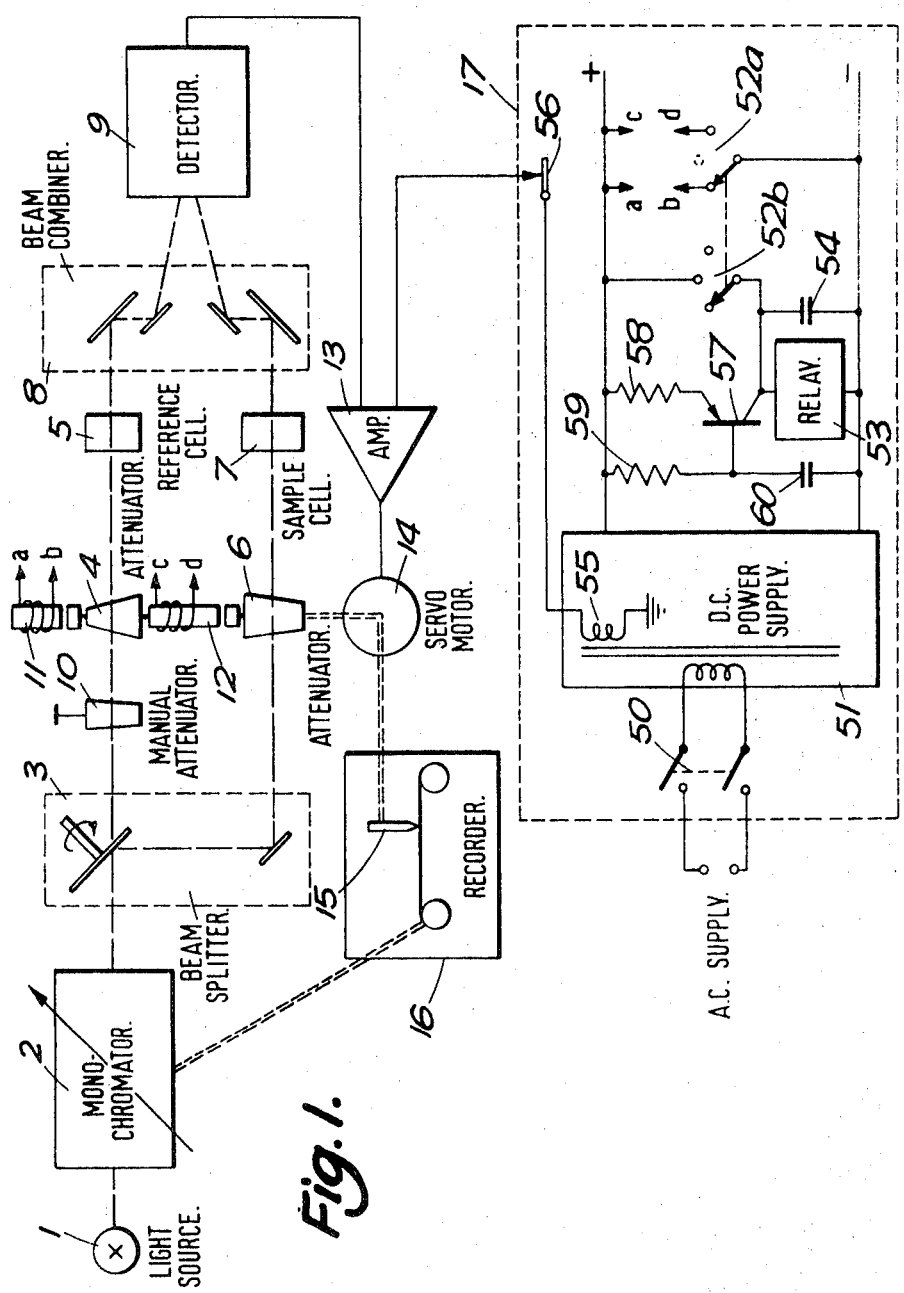
FIG. 1 is a schematic diagram of a spectrophotometer incorporating the invention.

Referring first to FIG. 1, light from a source 1 enters a monochromator 2. A substantially monochromatic beam of light leaves the monochromator and enters a beam splitting device indicated generally by the dotted rectangle 3. The beam splitting device 3 may, for example, comprise a rotating disc having alternate transmitting and reflecting sectors, mounted at an angle to the incident beam. The beam continues without deviation when it falls on a transmitting sector but is deflected when it falls on a reflecting sector. A fixed mirror is placed in the path of the beam reflected from the disc and oriented so as to direct the reflected beam along a path parallel to that of the transmitted beam. Monochromatic light leaving beam splitter 3 therefore traverses alternately two parallel paths.

The first of the said paths, hereinafter referred to as the reference path, passes through an optical attenuator 4 and a cell 5 to a first input of a beam combining device indicated generally at 8, while the second path, hereinafter referred to as the sample path, passes through an optical attenuator 6 and a cell 7 to a second input of beam combining device 8.

Device 8 may comprise an array of mirrors so oriented with respect to the reference and the sample beams as to deflect the said beams so that both fall upon the input of a radiation detector 9, which may for example be a photomultiplier tube.

Neglecting for the moment the optical attenuators 4 and 6, it is apparent that, if the absorption of radiation in the sample cell 7 is the same as that in the reference cell 5, the amounts of radiation reaching the detector 9 by the reference path and by the sample path should be the same, and that the output of detector 9 should be a constant d.c. voltage. A manually operated attenuator 10 is included in the reference path to permit initial setting up of the instrument to produce an optical null at the detector.

In cell 5 there is placed a reference material and in cell 7 a sample whose absorption spectrum is to be determined. Typically the sample comprises a substance of interest dissolved in a suitable solvent while the reference material comprises the pure solvent. Then any difference in the amounts of radiation reaching detector 9 via the sample path and via the reference path will be due solely to absorption of light by the sample material, since absorption by the solvent and by the cells themselves will be equal in the two paths and will cancel at the detector.

When an unbalance due to absorption of light by the sample occurs, the balance may be restored either by reducing the attenuation in the sample path, by means of attenuator, 6, or by increasing the attenuation in the reference path by means of attenuator 4. A greater degree of unbalance may be compensated by simultaneously reducing the attenuation in the sample path and increasing the attenuation in the reference path.

In the present instance, to provide a fine range of operation, suitable for measuring absorbances in the range $A = 0$ to $A = 0.2$, attenuator 6 alone is moved, while attenuator 4 is held in its minimum attenuation position by an electromagnetic latch indicated generally at 11. A coarse range of operation, covering $A = 0$ to $A = 1.0$ is provided by simultaneous operation of attenuators 4 and 6, which are then coupled together by a further electromagnetic latch 12.

Latches 11 and 12 are described in more detail below, with reference to FIG. 2.

When an unbalance occurs between the amounts of radiation reaching the detector 9 via the sample beam and via the reference beam, an a.c. component occurs in the detector output, which is amplified in amplifier 13. The output signal from amplifier 13 drives a servomotor 14 which is linked to attenuator 6 and also to the pen 15 of a chart recorder 16. The chart drive of recorder 16 is coupled to the wavelength control of monochromator 2.

Servomotor 14 drives attenuator 6 so as to maintain an optical equality of amplitudes of the two beams at the input of detector 9 and thus a null output. The record produced by recorder 16 is a plot of attenuator position against wavelength. Since attenuators 6 and 4 are adapted to produce a linear relationship between attenuator position and absorbance of the sample, the record is also a plot of absorbance against wavelength.

The circuit enclosed in the dotted rectangle 17, providing means of switching from fine to coarse range and vice versa, will be described subsequent to the detailed description of the attenuator assembly.

Referring now to FIGS. 2, 3 and 4, attenuators 4 and 6, comprising shaped slits cut or etched in metal foil, are mounted for movement transverse respectively to the reference and the sample beams on respective carriages 22 and 23.

Carriages 22 and 23 are identical with respect to their principal features, and comprise pulleys 24 which rest upon rail 25, and pulleys 26 which move along guide rail 27. Pulleys 26 are attached to carriages 22 and 23 respectively by spring mounts 28 which are in tension and act to maintain pulleys 26 in firm contact with rail 27 and pulleys 24 in firm contact with rail 25.

Rails 25 and 27 are mounted by means of supports 29 in spaced parallel relationship with the face of a plate 30 which is, in turn, mounted in the instrument in a plane normal to the sample and reference beams, and which is provided with an aperture 31 through which the beams may pass.

On the rear of plate 30 are mounted pulleys 32, 33 and 34 round which passes a flexible non-extensible cord 35, connected to a servomotor drive, the servomotor 36 being controlled by a signal deriving from the difference in intensity of the two light beams arriving at the detector. Cord 35 is secured in a block 37 mounted on the rear of carriage 22 and extending through aperture 31. Carriage 23 is not attached to cord 35.

On an extension of carriage 22 on the side facing carriage 23 is mounted a block 38 of easily magnetizable material, e.g., soft iron. On an extension of carriage 23 on the side facing carriage 22 is mounted an electromagnet comprising a coil 39 with a soft iron core 40. Block 38 and core 40 are so mounted on their respective carriages that when their adjacent faces are in contact, attenuators 4 and 6 are separated by the correct distance for simultaneous operation in the sample and reference beams. Items 38, 39 and 40 together comprise electromagnetic latch 12.

On carriage 23 is mounted a soft iron block 41 and on plate 30 is mounted an electromagnet comprising a coil 42 and a soft iron core 43. Block 41 and core 43 are so positioned that when their adjacent faces are in contact, carriage 23 is in a position such that attenuator 4 produces minimum attenuation of the reference beam. Items 41, 42 and 43 together comprise electromagnetic latch 11.

It is apparent that if block 38 is in contact with core 40 and coil 39 has a suitable current passing through it, while coil 42 is de-energized carriages 22 and 23 will be magnetically linked together. The servomotor may then move both carriages 22 and 23 in such a direction as to reduce the difference in intensity of the two light beams until a null balance is achieved at the detector.

If on the other hand block 41 is in contact with core 43, coil 42 being energized and coil 39 de-energized, carriage 23 will be magnetically locked in the position of minimum attenuation and will not be linked to carriage 22. The servomotor may then move carriage 23 only in such a manner as to produce a null balance at the detector.

It is necessary to ensure that whenever a change is made in the mode of operation the carriages are in the correct relative positions to enable the electromagnetic latches to perform their intended functions. Thus, in changing from coarse range to fine range, it is not sufficient merely to energize coil 42 and de-energize coil 39. Carriage 23 must also be moved to its extreme left hand position (FIG. 2) in order to bring block 41 into contact with core 43 so as to permit the magnetic locking of carriage 23 in the minimum attenuation position. Similarly in changing from fine range to coarse range, it is necessary to bring block 38 into contact with core 40 in order that the coupling between carriages 22 and 23 may become effective.

These requirements are met by arranging that when the instrument is first switched on, and whenever the range switch is subsequently operated, a transient signal is applied to the servomotor which overrides any signal from the detector and causes the servomotor to drive carriage 22 to its extreme left hand position (FIG. 2), if necessary also pushing carriage 23 to the left so that both block 41 is in contact with core 43 and block 38 is in contact with core 40.

When the said transient signal ceases, the servomotor will drive either carriages 22 and 23 together, or carriage 22 alone, to the position of null balance, according as coil 39 or coil 42 is energized.

A circuit to perform the range-changing function is illustrated in FIG. 1 within the dotted rectangle 17. a.c. power is applied via a double-pole on-off switch 50 to a power unit 51 which provides the various power supplies required by the several component parts of the instrument. Power unit 51 is of well-known design and is not here described in detail. Among the supplies provided by unit 51 is a d.c. supply for the energization of the electromagnetic latch coils 39 and 42.

Range switch 52 is a two-pole three-way rotary switch from which the detent associated with the middle stationary contact has been removed, so that the switch may be set to either the first or the third positions but wipes through the central position and cannot be set in that position.

The moving contact of one pole 52a of switch 52 is connected to the negative side of the said d.c. supply. One terminal of coil 42 is connected to the first stationary contact and one terminal of coil 39 is connected to the third stationary contact of switch 52a. The second terminals of coils 42 and 39 are connected to the positive side of the supply. Thus, in the first position of switch 52, coil 42 is energized and, in the third position, coil 39 is energized, as required for operation of the instrument in the fine and coarse range modes respectively.

Of the second pole 52b of switch 52, the second stationary contact is connected to the positive supply rail and the moving contact to one terminal of the operating coil of a relay 53, whose other terminal is connected to the negative supply rail. In changing the position of switch 52 from fine to coarse, or vice versa, relay 53 is momentarily energized as the moving contact wipes through the second position. A capacitor 54 connected in parallel with the coil of relay 53 serves to delay the release of the relay after the switch contact breaks.

An alternating signal derived from a winding 55 on a mains transformer in power unit 51 is fed via normally open contacts 56 of relay 53 to a second input of amplifier 13. This signal is of amplitude and phase sufficient to override any signal being fed to amplifier 13 from detector 9 and to cause servomotor 14 to drive carriage 22 to the limit of its travel, bringing block 38 into contact with core 40 and block 41 into contact with core 40. The said signal is fed to amplifier 13 only for the periods in which contacts 56 are closed.

A transistor 57 has its collector connected to the coil of relay 53 and its emitter connected via resistor 58 to the positive supply rail. The base of transistor 57 is connected to the positive rail via resistor 59, and a capacitor 60 is connected between the base and the negative supply rail.

When the instrument is operating normally, capacitor 60 is charged to the potential of the positive rail, and transistor 57 is cut off.

When the instrument is switched off, capacitor, 60 becomes discharged. Immediately after switching on transistor 57 passes current until the potential across capacitor 60 rises to a level sufficient to cut off the transistor. Current through the transistor 57 energizes relay 53, the contacts 56 are closed, and the signal from winding 55 is again applied to amplifier 13, driving the carriage to the limit of its travel.

The instrument may be set up initially by removing cells 5 and 7, or by filling both cells with reference material, and then adjusting attenuator 10 to give a null detector input with attenuator 4 in its position of maximum attenuation and attenuator 6 in its position of minimum attenuation, i.e., carriages 22 and 23 in their extreme right hand position as seen in FIG. 2. At the same time pen 15 is made to coincide with the zero absorbance line of the chart.

In the embodiment described, the fine range attenuator 6 which is directly driven by the servo, is placed in the sample beam and the coupled attenuator 4 is placed in the reference beam. It would be equally possible to place attenuator 6 in the reference beam and attenuator 4 in the sample beam. In this case the instrument would be set up to zero with attenuator 6 in its position of maximum attenuation and attenuator 4 in the position of minimum attenuation.

In the embodiment described, attenuators 4 and 6 are shaped according to an antilog law, to permit recording of sample absorbance $A$ as a linear function of wavelength or wave number. Other shapes may be employed to permit recording of other functions, for example, sample transmittance $T$ as a linear function of wavelength.

We claim:

1. In a two-range spectrophotometer of the double-beam null-type comprising a sample cell, means providing a reference beam, means for passing a sample beam through said sample cell, and detector means responsive to the difference in amplitude of the two beams, first and second carriages movable co-linearly, first and second adjustable attenuators mounted respectively on said first and second carriages, one of the attenuators being arranged in the sample beam and the other in the reference beam, the first attenuator giving a range of attenuation M and the second attenuator having a different range of attenuation N where N is greater than M, servo means controlled by said detector means for adjusting the first attenuator in accordance with that difference in amplitudes of the beams at said detector means, and range selector means selectively operable either to couple said first and second carriages together or to couple said second carriage to a fixed datum member, and electromagnetic coupling means for coupling said first and second carriages in accordance with the selective operation of said range selector means.

2. A spectrophotometer as claimed in claim 1 further comprising a recorder having a recorder pen linked to the first carriage for recording on either range according to the setting of the range selector means.

3. A spectrophotometer as claimed in claim 1 wherein said first and second attenuators each comprise an opaque element having at least one slit shaped so that, as the element is traversed across the radiation beam, the latter falls on different width portions of the slit according to the attenuator setting.

4. A spectrophotometer as claimed in claim 1 further comprising electric control means for actuating said electromagnetic coupling means in response to the selective operation of said range selector means.

5. A spectrophotometer as claimed in claim 1 wherein said selector means comprise a control switch having two positions with detents for locking the switch, which positions correspond to two ranges, said switch having contacts in said two positions controlling said electromagnetic coupling means.

6. A spectrophotometer as claimed in claim 5 wherein said two ranges are a fine and a coarse range and further comprising automatic means operative on switching said selector switch from said fine range to said coarse range to bring the two carriages together so that they may be coupled when the switch is in said coarse range position, and further automatic means operative on switching said selector switch from said coarse range to said fine range to adjust the position of said second carriage to the datum position so that it may be locked when the switch is in said fine range position.

7. A spectrophotometer as claimed in claim 6 further comprising a servo drive for linearly moving said first carriage and wherein said automatic means includes a circuit, said switch has an intermediate temporary position in which said circuit is completed as the switch is moved from one range setting to the other, said circuit feeding a signal into the servo drive to drive said second carriage in the direction towards said first carriage whereby the two carriages are driven together to one extremity of their respective travel.

8. A spectrophotometer as claimed in claim 7 wherein in response to said signal said servo drive sets said first attenuator for maximum attenuation and said second attenuator for minimum attenuation.

9. A spectrophotometer as claimed in claim 7 further comprising a relay, with means for holding the relay, for maintaining said circuit closed for a period sufficiently long for the adjustment of the attenuators to be effected.

10. A spectrophotometer as claimed in claim 7 wherein said circuit comprises means for feeding a signal to said servo drive for overriding the output of said detector means to set said second attenuator to its minimum position.

11. A spectrophotometer as claimed in claim 10 further comprising means for automatically feeding a signal to said servo drive when the spectrophotometer is first switched on to override the output of the detector means and move the two carriages together and set said second attenuator to its minimum position.

12. A spectrophotometer as claimed in claim 1 wherein said first and second attenuators are respectively mounted so that when coupled together adjustment thereof provides increasing attenuation in one beam and decreasing attenuation in the other beam.

13. A spectrophotometer as claimed in claim 12 further comprising locking means for locking said second carriage carrying said second attenuator to said fixed datum member whereby said second attenuator provides minimum attenuation.

14. A two-range spectrophotometer of the double-beam null-type comprising a reference cell, a sample cell, means for passing a reference beam through said reference cell, means for passing a sample beam through said sample cell, detector means responsive to the difference in amplitude of the two beams, linearly movable first and second adjustable attenuators, one of the attenuators is positioned in the sample beam and the other attenuator is positioned in the reference beam, the first attenuator giving a range of attenuation M and the second attenuator having a range of attenuation N where N is greater than M, servo means controlled by said detector means for adjusting the first attenuator in accordance with the difference in amplitudes of the beams at said detector means, first electromagnetic coupling means operable to couple the two attenuators to move together, second electromagnetic coupling means operable to lock said second attenuator in a datum position introducing minimum attenuation, range selector means including a control switch having two positions with detents for locking the switch and an intermediate position without detents, a first control circuit completed by said switch in one of said two positions operative to energize said first electromagnetic coupling means, a second control circuit completed by said switch in the other of said two positions to energize said second electromagnetic coupling means, a third control circuit completed by said switch in said intermediate position to energize said servo means to drive the first attenuator to its position of maximum attenuation and a recorder linked to said first attenuator.

15. In a two-range spectrophotometer of the double-beam null-type comprising a sample cell, means providing a reference beam, means for passing a sample beam through said sample cell, and detector means responsive to the difference in amplitude of the two beams, first and second carriages movable co-linearly, first and second adjustable attenuators mounted respectively on said first and second carriages, one of the attenuators being arranged in the sample beam and the other in the reference beam, the first attenuator giving a range of attenuation M and the second attenuator having a different range of attenuation N where N is greater than M, servo means controlled by said detector means for adjusting the first attenuator in accordance with that difference in amplitudes of the beams at said detector means, and range selector means selectively operable either to couple said first and second carriages together or to couple said second carriage to a fixed datum member, and electromagnetic locking means for locking said second carriage in the datum position.

16. In a two-range spectrophotometer of the double-beam null-type comprising a sample cell, means providing a reference beam, means for passing a sample beam through said sample cell, and detector means responsive to the difference in amplitude of the two beams, first and second carriages movable co-linearly, first and second adjustable attenuators mounted respectively on said first and second carriages, one of the attenuators being arranged in the sample beam and the other in the reference beam, the first attenuator giving a range of attenuation M and the second attenuator having a different range of attenuation N where N is greater than M, servo means controlled by said detector means for adjusting the first attenuator in accordance with that difference in amplitudes of the beams at said detector means, and range selector means selectively operable either to couple said first and second carriages together or to couple said second carriage to a fixed datum member, said range selector means comprises a first electromagnetic coupling unit having cooperating ferromagnetic abutment members on the two carriages, a coil on at least one of said members, means for electrically energizing the coil to attract said members of said first coupling unit into abutting relationship, and a second electromagnetic coupling unit having cooperating ferromagnetic abutment members on the second carriage and on said fixed datum member respectively, a coil on at least one of the members of said second coupling unit and means for electrically energizing the coil to attract said members of said second coupling unit into abutting relationship, the first and second coupling units being operative on said second carriage in opposed directions.

* * * * *